Patented Jan. 9, 1940

2,186,392

UNITED STATES PATENT OFFICE 2,186,392

PRODUCTION OF AMMONO ALCOHOLS

Arthur Ferdinand August Reynhart, Beverwijk, Netherlands, assignor to Shell Development Company, San Francisco, Calif., a corporation of Delaware No Drawing. Application June 6, 1938, Serial No. 212,129. In Great Britain June 14, 1937

12 Claims. (Cl. 260—584)

The present invention relates to an improved method for the production of ammono alcohols. More particularly, it relates to a method whereby ammono alcohols may be more economically produced from ammonia or primary amino compounds with better yields and with appreciably less formation of ammono ethers and quaternary ammonium bases. Most particularly, the invention relates to an improved method for the production of alkylol amines.

The amino compounds can be considered as comprising ammonia and derivatives of ammonia in which one, two, or three of the hydrogen atoms are replaced by monovalent organic radicals. There are, therefore, beside the parent substance, ammonia, three classes, namely, the primary amines $RNH_2$, the secondary amines, $R_2NH$, which two classes constitute the class of compounds known as the ammono alcohols, and the tertiary amines $R_3N$, which are known as the ammono ethers. For a further description and definition of ammono alcohols reference is made to "Nitrogen System of Compounds" by E. C. Franklin, an American Chemical Society Monograph Series publication, and particularly to chapter 25, beginning at page 217 of said publication. There are, furthermore, the quaternary ammonium compounds which are analogous to the ammonium salts. The group attached to the nitrogen in all cases may be the same or different and may contain other reactive groups.

Amino compounds are produced industrially through the reaction of ammonia or other amino compounds with suitable reactants whereby one or more amino hydrogen atoms are substituted by the desired organic radical. For example, a mixture containing ammonia, primary, secondary, and tertiary amines, and some quaternary ammonium compounds is produced by reacting ammonia with an alkyl halide. The equations are:

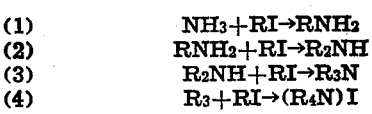

The ammonia may be anhydrous, or in solution in alcohol or water and the reactions are usually carried out at moderate temperatures under moderate pressures.

Another typical and industrially important example is the production of alkanol amines by the reaction of ammonia with an alkylene oxide. Using ethylene oxide, for example, the reactions are

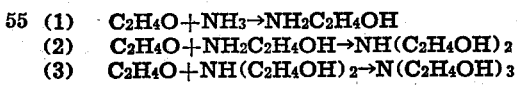

In these and similar processes the reaction tends strongly to go to completion with the formation of tertiary amino compounds and in many cases to form quaternary ammonium compounds. Thus, for example, under normal operating conditions the product obtained by the latter of the above processes consists of about 85% triethanol amine, 10% di-ethanolamine and 5% primary ethanolamine. Since in reactions such as the above the first reaction controls the overall reaction rate, as can be seen from the relative quantities of the various products in the reaction mixture, reactions of this type are much more suited for the production of ammono ethers than for the production of ammono alcohols.

The proportions in which the possible products are formed present a very complicated problem and depend not only upon the relative rates of reaction of the intermediate products, but, also upon the solubilities of the compounds, the mol ratio of the reactants, etc. Numerous attempts have been made to adapt such processes to the production of ammono alcohols by endeavoring to control the reactions. For example, it has been found that the formation of ammono alcohols may be favored by using very low ratios of reactant to ammonia or primary amino-compound and by using a large excess of water. By executing the reaction under these conditions there is, however, considerable formation of tertiary amino-compounds and certain other disadvantages which militate against the economy of the process. For example, by reacting ethylene oxide with ammonia in the ratio of 1 to 20–50 in the presence of a large excess of water a fair yield of monoethanolamine may be obtained but the process has the disadvantages of requiring the absorption of the large quantities of excess ammonia and requiring the concentration of a relatively small amount of product from a large amount of water. The preparation of ammono alcohols has also been tried using numerous conditions of temperature, pressure, reaction time, method of introducing reactants, mol ratio of reactants, etc., but without appreciable success. For this reason the supply of many of the ammono alcohols of commerce is obtained from the by-products in the production of the corresponding tertiary amino-compounds or at least incur the production of considerable quantities of tertiary amino compounds in the process of their production. Since there is an ever increasing demand for ammono alcohols, it is highly desirable to be able to produce these compounds without the necessity of producing relatively large quantities, if not predominant quantities of higher substituted products.

An object of the present invention is to provide a process whereby ammono alcohols may be produced from amino compounds, such as ammonia or a primary amino compound, without any appreciable loss due to the formation of ammono ethers. A further object is to provide a method whereby primary amino compounds may be produced from ammonia in good yields while the formation of secondary and tertiary amino-compounds is materially reduced. Another object of the invention is to provide an improved method for the production of monoalkanolamines. Still another object is to provide a method for the production of ammono alcohols affording a simple method of recovery of the products from the reaction system.

These objects are realized, according to the present invention by carrying out the reaction in the presence of a salt of a weak acid with a weak base.

Although I do not desire my invention to be limited by the soundness of any theories advanced to explain the reaction mechanisms thereof, the apparent mechanism is believed to be useful in furthering the appreciation and understanding of my process. The superior yield of desired products obtained according to the present invention are, I believe, due to the protection of the first formed desired product by the immediate formation of a salt therewith with a suitable acid. As both theoretical consideration and experiments have shown, the substitution of hydrogen atoms in ammonia by positive organic radicals results in the formation of compounds of increased basicity. This is illustrated, for example, in the following table in which $K$=the true dissociation constant.

*Compound $K \times 10^{-7}$*

| Compound | $K \times 10^{-7}$ |
|---|---|
| Ammonia | 0.341 |
| Methylamine | 5.04 |
| Dimethylamine | 20.32 |
| Trimethylamine | 1.01 |
| Tetramethyl ammonium hydroxide, | too large to measure. |
| Ammonia | 0.341 |
| Ethylamine | 7.44 |
| Diethylamine | 11.36 |
| Triethylamine | 11.26 |
| Tetraethyl ammonium hydroxide, | too large to measure. |

As will be noted in the above table, the tertiary amines, although stronger bases than the secondary amines, are weaker bases than secondary amines in water solutions (due to solvation).

In the process of the present invention when reacting, for example, ammonia with an alkylene oxide in the presence of, for instance, an ammonium salt of a weak acid, the primary amine as soon as formed, being a stronger base than ammonia, liberates free ammonia from the ammonium salt and reacts with the liberated acid to form the corresponding primary amine salt of the weak acid. The primary amine salt thus formed, being less reactive, remains in the reaction mixture without undergoing further reaction, while the free ammonia is consumed. Likewise, when preparing a secondary amino-compound according to the present invention from a primary amino compound, less than the stoichiometric amount of a suitable weak acid is first reacted with the primary amino-compound to form the corresponding salt of the weak acid. Upon reacting, the secondary amino-compound, being a stronger base than the primary amino-compound displaces the latter from its salt and thereby becomes protected from further reaction while the primary amino-compound is consumed by reaction. The present process is not applicable to the preparation of tertiary amino-compound since these, in the aqueous system of the present invention, are weaker bases than the secondary amino-compounds and therefore unable to displace the salt of the latter.

The present invention is applicable to all reactions for the preparation of ammono alcohols in which it is desired to substitute an amino hydrogen atom by a positive radical. Thus, for example, the present process is applicable in the substitution of positive organic radicals into such amino compounds as ammonia, primary alkyl amines, primary alkanolamines, primary chloramines, primary alkarylamines, primary cyclo-paraffine amines, primary-secondary alkyl di-amines, etc.

The substituting radicals applicable in the present invention include, generally, all positive radicals such as, for instance, alkyl radicals, alkanol radicals, secondary amino alkyl radicals, cyclo-paraffine radicals, and the positive analogues and substitution products thereof. By the term "positive" I mean positive with respect to a hydrogen atom. Since such substituents as halide radicals, radicals of the pseudo halides such as CNO, CN, SCN, etc., carbonyl groups, and aromatic radicals are strongly negative, it will be apparent that the substituting radicals of the present invention will be devoid of such substituents. One such weakly negative substituent as a hydroxy group or an ethylenic linkage may be present, however, since the radicals containing them are still more positive than a hydrogen atom. It is to be understood, however, that negative constituents may be present in the primary amino compound being converted into a secondary amino compound. Thus, for example, the present process is applicable in the reacting of ethylene oxide with benzyl amine to form ethanol benzylamine. The above substituting radicals are comprehended and embraced within the term "aliphating agent" which is used in the claims to denote that agent which through reaction introduces an aliphatic radical into the compound being reacted upon.

The positivity and hence applicability of the substituting radicals in the present invention are, in general, not affected to any appreciable extent by the number of carbon atoms they contain. This is illustrated by the following table showing the dissociation constants, $K_b \times 10^{-4}$, of a few alkyl amines.

*Amine $K_b \times 10^{-4}$*

| Amine | $K_b \times 10^{-4}$ |
|---|---|
| $CH_3NH_2$ | 5.0 |
| $C_2H_5NH_2$ | 5.6 |
| $C_3H_7NH_2$ | 4.7 |
| $C_4H_9NH_2$ | 4.1 |
| $(CH_3)_2CHNH_2$ | 3.1 |

Numerous processes of the prior art require the separation of the desired product or products from a salt of an amino-compound with a strong acid. The separation of amino-compounds from such salts, being expensive, time-consuming, and difficult, is avoided as far as possible by those skilled in the art, but in many cases is an unavoidable step. According to the present invention, as previously pointed out, I believe the desired product, as soon as formed, displaces a weaker base from its salt with a weak acid and thereby becomes protected in some manner against further reaction. The salts formed according to the present invention, being salts of weak acids, do not offer the difficulties in separation encountered by the prior art in the separation of amino-compounds from their corresponding salts of strong acids. In the usual practice of my invention the ammono alcohol is separated by distillation at either atmospheric or diminished pressure. The weak acids employed in the process of the present process form salts with the desired ammono alcohol which at the temperature and pressure of distillation are dissociated into the free acid and free amino compound. It is to be understood, however, that, if desired, the products of reaction made according to the present process may also be recovered from their salts by any of the usual methods.

By a salt of a weak acid I mean a salt having as a cation either ammonium, the amino-compound undergoing substitution to a secondary amino-compound or a non-reacting cation of basicity less than the amino-compound being prepared, and as an anion an anion of an acid capable of forming a salt with ammonia or the primary amino-compound being reacted, said salt being capable of dissociation at the temperature and pressure of the distillation of the desired product.

As a matter of convenience and economy it is preferable to use the material being reacted as the salt forming cation. Thus, for example, when converting ammonia into a primary amino-compound it is preferable to use an ammonium salt of the acid and when converting a primary amino-compound into a secondary amino-compound it is preferable to use a salt of the primary amino-compound.

The anion of the salt may be the anion of any of the weak acids which are capable of forming a salt decomposable at distillation temperature with the desired ammono alcohol. However, for convenience and economy the salt of the more common weak acids such as acetic acid, carbonic acid, boric acid, benzoic acid, citric acid, hydrogen sulfide, lactic acid, etc., are preferred. These acids may be added to the reaction mixture as such, in which case they immediately react with the ammonia or primary amino-compound to form salts, or may be added as the corresponding salt, in which case they introduce a mol equivalent of reactant. Thus, nearly all of the amino-compound may be introduced in the form of an appropriate salt.

In general, the effectiveness of the salt in the reaction mixture is proportional to the quantity present. Thus, small quantities of the applicable salts effect a small increase in yield and larger quantities are increasingly effective until the total quantity of amino-compound reactant is introduced as a salt. If this last amount is used the reaction proceeds very slowly at first and for this reason it is preferable to have a small excess of free amino compound at the start of the reaction.

The reaction may be made to proceed more smoothly, if desired, by the addition to the reaction system of a small amount of a suitable emulsifying or capillary active agent such as, for example, stearyl glycol, etc. Likewise, suitable solvents, such as alcohols, ketones, etc., may be used.

Since the salt of the product, as prepared according to the present invention, is dissociable by heat, the reaction temperature is preferably kept appreciably below the temperature of dissociation of the salt. A favorable temperature is between about 0° C. and 100° C., preferably between about 10° C. and 50° C.

The following examples, which are presented solely for the purpose of illustrating the invention, illustrate an economical preparation of ethanolamine. In Example I half of the total ammonia used was introduced as a salt.

Example I 150 gms. of a 26% ammonia solution and 140 gms. of an 80% ammonium carbonate solution were introduced into a reaction vessel provided with a thermometer and an inlet tube and equipped with cooling and agitating means. Ethylene oxide was introduced into the above mixture while the temperature was maintained between 30 and 35° C. and the mixture was well agitated. During a period of 50 minutes, 54 gms. ethylene oxide was absorbed. The reaction mixture was then fractionated, whereupon the monoethanolamine salt of carbonic acid was dissociated.

The fraction distilling between 130° C. and 200° C. was separated and yielded upon refractionation 45 gms. of pure mono-ethanol amine. The other fractions contained, in total, 23 gms. of higher amines, mostly diethanol amine. The yield of mono-ethanol amine thus amounted to 66.2% calculated on the total quantity of amines formed.

Example II

In an apparatus consisting of an absorption column partly filled with Raschig rings, the lower part of which was connected with a cooling vessel provided with a coil cooled by means of water, and of a circulating pump, about 25 litres of an aqueous solution containing 20.1% by weight of ammonia and 17.9% by weight of carbon dioxide, the molecular proportion of $NH_3$ to $CO_2$ thus being 2.9, were kept in circulation by means of the pump, which pumped the solution, passing from the lower part of the column into the cooling vessel, back to the top of the column at a rate of about 1000 litres per hour. About 1 kg. of ethylene oxide was introduced in the middle part of the column into the circulating solution at a temperature of 30° C.

After the reaction the resulting reaction liquid proved to contain about 7.9% by weight of amino compounds. The reaction mixture was then fractionated, as a result of which the ethanolamine salt of carbonic acid was dissociated. 77% of the reaction products formed was found to be pure monoethanol amine.

Although the reactions in the present process are preferably carried out in the presence of water and with an excess of ammonia or amino-compound, it is not necessary that a large volume of water be present. Likewise, in the preparation of ethanol amines, according to the present invention, it is not necessary to employ a mol ratio of ammonia to alkylene oxide of 20 to 1 or greater as is necessitated by the processes of the prior art.

I claim as my invention:

1. A process for the production of mono-ethanol amine which comprises reacting ammonia and an ammonium salt of a weak acid with ethylene oxide, at a temperature below that at which said salt dissociates.

2. A process for the production of primary alkanol amines which comprises reacting ammonia and an ammonium salt of an acid taken from the group consisting of carbonic acid, boric acid, acetic acid, benzoic acid, citric acid, hydrogen sulfide, and lactic acid, with an alkylene oxide, at a temperature below that at which said salt dissociates.

3. A process for the production of primary alkanol amines which comprises reacting ammonia and an ammonium salt of a weak acid with an alkylene oxide, at a temperature below that at which said salt dissociates.

4. A process for the production of primary alkanol amines which comprises reacting ammonia and an ammonium salt of a weak acid, at a temperature below that at which said salt dissociates, with an aliphating agent wherein an alkanol group positive with respect to hydrogen is present, and removing a primary alkanol amine from the reaction system.

5. A process for the production of primary aliphatic amino compounds which comprises reacting ammonia and an ammonium salt of a weak acid, at a temperature below that at which said salt dissociates, with an aliphating agent wherein the aliphatic radical is positive with respect to hydrogen.

6. A process for the production of primary amino compounds which comprises reacting ammonia and an ammonium salt of a weak acid, at a temperature below that at which said salt dissociates, with an aliphating agent wherein is present an aliphatic radical which is positive with respect to hydrogen.

7. A process for the production of aliphatic ammono alcohols which comprises reacting a compound selected from the group consisting of ammonia and the primary amines, and a salt of a weak acid and of a compound of the above group, with an aliphating agent wherein is present an aliphatic radical which is positive with respect to hydrogen, effecting said reaction at a temperature below that at which said salt dissociates, and recovering an aliphatic ammono alcohol from the reaction system.

8. A process for the production of ammono alcohols which comprises reacting an amino compound selected from the group consisting of ammonia and the primary amines, with a salt of an amino compound of the above group and an acid taken from the group consisting of carbonic acid, boric acid, acetic acid, benzoic acid, citric acid, hydrogen sulfide, and lactic acid, and with an aliphating agent wherein the aliphatic radical is positive with respect to hydrogen, and effecting said reaction at a temperature below that at which said salt dissociates.

9. A process for the production of ammono alcohols which comprises reacting a compound taken from the group consisting of ammonia and the primary amines, with a salt of a weak acid and a compound of the above group, and with an aliphating agent wherein an alkanol radical positive with respect to hydrogen is present, and effecting said reaction at a temperature below that at which the salt dissociates.

10. A process for the production of ammono alcohols which comprises reacting a compound taken from the group consisting of ammonia and the primary amines, with a salt of a weak acid and of a compound of the above group, and with an aliphating agent wherein the aliphatic radical positive with respect to hydrogen is present, and effecting said reaction at a temperature below that at which the salt dissociates.

11. A process for the production of ammono alcohols which comprises reacting a compound taken from the group consisting of ammonia and the primary amines, with a salt of a weak acid and of an amino compound of the described group, and with an aliphating agent wherein is present an aliphatic radical which is positive with respect to hydrogen, effecting said reaction at a temperature below that at which the salt dissociates, and distilling the resulting ammono alcohol from the reaction system.

12. A process for the production of ammono alcohols which comprises reacting a salt of a compound selected from the class consisting of ammonia and the primary amines, with a weak acid containing an excess of said free ammono compound, and with an aliphating agent wherein the aliphatic radical positive with respect to hydrogen is present, and effecting the reaction at a temperature below that at which the salt dissociates.

ARTHUR FERDINAND
AUGUST REYNHART.